Patented Aug. 31, 1954

2,688,022

UNITED STATES PATENT OFFICE 2,688,022

1-AMINOALKYL-3-CARBOLINES

Robert R. Burtner, Skokie, Ill., assignor to G. D. Searle & Co., Chicago, Ill., a corporation of Illinois No Drawing. Application April 13, 1953, Serial No. 348,579

9 Claims. (Cl. 260—296)

This invention relates to dialkylaminoalkyl-carbolines, their acid addition and quaternary ammonium salts, and processes for the manufacture of these carbolines and their salts. In particular this invention relates to 3-carboline derivatives of the formula

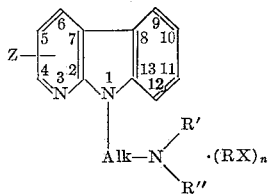

wherein Z is hydrogen or a methyl radical; Alk is a lower alkylene radical containing at least 2 and not more than 4 carbon atoms; R is hydrogen, or a lower alkyl radical containing not more than 4 carbon atoms; NR'R'' is either a lower dialkylamino radical or a nitrogen-containing heteromonocyclic radical; X is one equivalent of an anion; and $n$ is either 0 (where the compound is a tertiary base) or it is 1 (where the compound is a quaternary ammonium salt or a salt comprising one molecule of tertiary base plus one equivalent of an acid) or it is 2 (where the compound comprises one molecule of base plus two equivalents of an acid).

In the compounds of the foregoing formula, Alk represents an alkylene radical such as ethylene, propylene, butylene, trimethylene, tetramethylene, and like bivalent radicals derived from saturated aliphatic hydrocarbons containing from 2 to 4 carbon atoms. The radical R represents either hydrogen or a lower alkyl radical such as methyl, ethyl, propyl, isopropyl, butyl, isobutyl, and secondary butyl. The radicals R' and R'' represent lower alkyl radicals of the foregoing type; or, taken together with the attached nitrogen, they represent saturated, nitrogen-containing, heterocyclic radicals such as piperidino, morpholino, and pyrrolidino radicals. The substituent X represents one equivalent of an anion as remarked, and includes such non-toxic anions as chloride, bromide, iodide, methyl sulfate, ethyl sulfate, benzenesulfonate, toluenesulfonate, tartrate, succinate, malate, acetate, citrate, nitrate, sulfate, phosphate, sulfamate and the like.

The compounds of this invention are useful chemotherapeutic materials in the field of cardiac pathology. In particular, they are valuable because of their digitalis-like activity, showing marked capacity for myocardial stimulation in instances of insufficiency associated with the failing heart.

The amine bases which comprise this invention are relatively insoluble in water, but may be dissolved in dilute acids and in most of the common organic solvents. The acid addition and quaternary ammonium salts of this invention are, on the other hand, readily soluble in water and in aqueous solutions of alcohols or other water-miscible organic solvents. The subject compounds may be administered in solid form as tablets or capsules; dissolved in aqueous media they may be given parenterally.

The compounds to which this invention relates are conveniently prepared starting with the appropriate 3-carboline, which may be obtained by the method of Freak and Robinson as reported in the "Journal of the Chemical Society," 1938, 2014. The 3-carboline is reacted, successively, with a condensing agent, such as sodamide, and a dialkylaminoalkyl halide, for example diethylaminoethyl chloride, to produce the corresponding 1 - dialkylaminoalkyl-3-carboline. Various inert, non-polar, organic liquids will serve as reaction media, toluene having been found a solvent of choice when sodamide is the condensing agent. With potassium carbonate, methyl ethyl ketone may be used. The reaction is commonly run at temperatures of 90° to 110° centigrade and completed after approximately 20 hours. Temperatures of the order of 20° higher or lower may also be used, and the reaction time may vary from 10 to as long as 36 hours. An inert atmosphere, such as a nitrogen atmosphere, is ordinarily maintained throughout the course of the reaction, though this may be dispensed with after the first two or three hours. The 1-dialkylaminoalkyl-3-carboline thus formed, the formula of which is

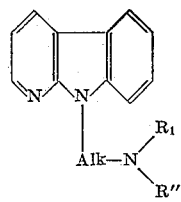

where Alk, R' and R'' have the meanings hereinbefore defined, may then be converted to the acid addition salt by simple admixture with one or two equivalents of any of various inorganic and strong organic acids, the anionic portion of which conforms to the definition of X as set forth above. Alternatively, the said 1-dialkylaminoalkyl-3-carboline may be quaternized by addition of an alkyl ester of the formula

R—X where R and X have the meanings hereinabove assigned. Quaternization takes place in the temperature range 0° to 50° centigrade, using an inert solvent such as chloroform, acetone, methyl ethyl ketone, methanol, butanol and the like. The reaction is ordinarily completed in from 12 to 48 hours and is generally carried out in a closed system if a lower alkyl halide, such as methyl chloride, is one of the reagents. Using methyl chloride, the reaction may be smoothly effected in chloroform solution at 25° centigrade for 24 hours.

The following examples will illustrate in detail certain of the carboline derivatives which constitute the present invention, and methods which have been devised for their preparation. However, the invention is not to be construed as limited thereby either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.), pressures in millimeters (mm.) of mercury, and relative amounts of materials in parts by weight, except as otherwise noted.

*Example 1*

A. *1-(β-diethylaminoethyl)-3-carboline.*—To a stirred suspension of 39 parts of sodamide in 3500 parts of dry toluene at 90–100° C. under an atmosphere of nitrogen is added 170 parts of 3-carboline. The reactants are refluxed and stirred for approximately three hours, by the end of which time the evolution of ammonia is found to be practically completed. Heating is discontinued, and 135 parts of β-diethylaminoethyl chloride is then slowly added at a rate such that moderate refluxing continues. Heating is resumed as required to maintain reflux temperatures for 15 hours. Approximately 4000 parts of water is then added, whereupon the toluene layer is, successively, separated, washed with water, and subjected to vacuum distillation to remove the solvent. The clear brown oil which remains is the desired 1-(β-diethylaminoethyl)-3-carboline.

B. *1-(β-diethylaminoethyl)-3-carboline dihydrochloride.*—The base of the foregoing part A is converted to the hydrochloric acid salt by dissolving in 2100 parts of anhydrous ether and treating with two molecular equivalents of absolute alcoholic hydrogen chloride solution. The dihydrochloride, which granulates on standing, is recovered on a funnel, rinsed thereon with ether, and finally dried at 75° C. in that order. Crystallization from 2800 parts of absolute alcohol, using decolorizing charcoal in process, gives white crystals of 1-(β-diethylaminoethyl)-3-carboline dihydrochloride, M. P. 230–231° C. The material is readily soluble in water.

C. *1-(β-diethylaminoethyl)-3-carboline methobromide.*—A solution of 117 parts of 1-(β-diethylaminoethyl)-3-carboline, prepared according to the technique of part A of this example, and 41 parts of methyl bromide, in 750 parts of dry chloroform, is allowed to react in a closed system for 24 hours at 25° C. The solvent is then stripped in vacuo, leaving a viscous residue which is taken up in 2100 parts of anhydrous ether. The crystalline quaternary compound forms on standing. It is recovered on a funnel, rinsed thereon with ether, and finally dried in vacuo over sodium hydroxide. The pale yellow quaternary salt thus obtained melts at 155° C. Crystallization from 9 volumes of a mixture of 35 parts of isopropyl alcohol and 80 parts of ethyl acetate, using decolorizing charcoal in process, gives colorless crystals of 1-(β-diethylaminoethyl)-3-carboline methobromide, M. P. 155–156° C. The product is quite soluble in water. It has the formula

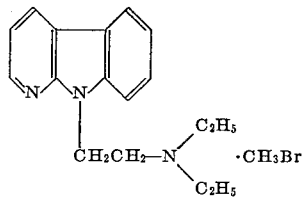

*Example 2*

A. *1 - (4' - methyl - 2' - pyridyl) - benzotriazole.*—A mixture of 86 parts of 2-bromo-4-methylpyridine, 54 parts of o-phenylenediamine, and 2 parts of copper powder is heated in a jacketed vessel for 4 hours at 140–155° C. (jacket temperature) under an absolute pressure of 40 mm. of mercury. The mixture, which refluxes gently at first, gradually becomes more viscous and ceases reflux as the reaction progresses. The semisolid product is dissolved in 260 parts of hot alcohol; and 1250 parts of 10% aqueous hydrochloric acid is then added, whereupon the copper is filtered out, and a solution of 63 parts of sodium nitrite in 630 parts of water is then added very slowly at 5–10° C. to the stirred filtrate. Following addition of the sodium nitrite, stirring is continued for 1 hour longer at 5° C., after which the reactants are allowed to warm to 25° C. overnight. The gray precipitate which has formed is, successively, recovered on a funnel, rinsed thereon with water, and dried at 25° C. The product thus obtained is 1-(4'-methyl-2'-pyridyl)-benzotriazole, M. P. 117–118° C. Crystallization from 20 volumes of methanol gives pale gray needles, M. P. 118° C.

B. *6-methyl-3-carboline.*—A stirred solution of 81 parts of the triazole of the preceding part A in 700 parts of phosphoric acid is cautiously heated to 150° C. Moderate evolution of nitrogen occurs. Temperature of the reactants is slowly increased to 200° C. over a period of 30 minutes, by the end of which time nitrogen evolution practically ceases. The materials are heated and stirred for 15 minutes longer at 200–205° C., at which point the mixture is cooled to 25° C., and a hot solution of 160 parts of picric acid in 2000 parts of alcohol, followed by 830 parts of hot water, is then added. Refrigeration overnight promotes precipitation of the picrate, which is filtered off and then suspended in 4800 parts of 8% aqueous caustic soda at approximately 75° C. The crude methylcarboline which separates is recovered on a funnel and rinsed thereon with hot water until the washings are substantially free of color. Upon drying at 75° C., a gray amorphous powder is obtained which is subjected to continuous extraction with 400 parts of boiling alcohol for 24 hours. Upon separating and cooling the extract, brown crystals are precipitated which, recovered on a funnel and dried at 75° C., show M. P. 212-213° C. A further 320 parts of alcohol is added to the extraction residue, and the mixture is allowed to boil for 20 minutes. The mixture is then filtered, and this filtrate is combined with that from the precipitation above. Vacuum concentration of the combined filtrates to about one-tenth the original volume gives a second crop of crystals, pale yellow in color, M. P. 215° C. Recrystallization of the 2 crops of crystals from 40 volumes of methyl alcohol gives nearly colorless 6-methyl-3-carboline, M. P. 215° C.

C. *1 - (β - diethylaminoethyl) - 6 - methyl - 3-carboline.*—Using essentially the procedure of Example 1A, 55 parts of the above 6-methyl-3-carboline, 12 parts of sodamide, and 41 parts of β-diethylaminoethyl chloride, in 1750 parts of dried toluene, are reacted at reflux temperatures for 24 hours to produce in good yield 1-(β-diethylaminoethyl)-6-methyl-3-carboline.

D. *1 - (β - diethylaminoethyl) - 6 - methyl - 3-carboline dihydrochloride.*—Preparation of the dihydrochloride of 1-(β-diethylaminoethyl)-6-methyl-3-carboline is carried out in anhydrous ether solution using two equivalents of absolute alcoholic hydrochloric acid according to the technique detailed in Example 1B. The crude salt so obtained is crystallized from 8 volumes of absolute alcohol, using decolorizing charcoal in process, to give white crystals of 1-(β-diethylaminoethyl)-6-methyl-3-carboline dihydrochloride, M. P. 246-247° C. The product is moderately soluble in water.

E. *1 - (β - diethylaminoethyl) - 6 - methyl - 3-carboline diethyl sulfate.*—A mixture consisting of 73 parts of 1-(β-diethylaminoethyl)-6-methyl-3-carboline, 42 parts of diethyl sulfate, and 425 parts of anhydrous butanol is maintained at 50° C., with stirring, for 30 hours. The quaternary ammonium compound so prepared has the formula

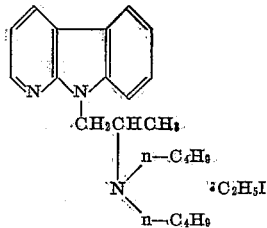

Example 3

A. *1 - (β - di - n - butylaminopropyl) - 3 - carboline.*—To a stirred suspension of 78 parts of sodamide in 7000 parts of benzene at reflux temperature under a nitrogen atmosphere is added 340 parts of 3-carboline. Refluxing is continued, with stirring, until evolution of ammonia gas ceases—which is usually after about 5 hours. At this point heating is temporarily discontinued while 500 parts of β-di-n-butylaminopropyl chloride is slowly added, following which heat is again applied and reflux maintained, with stirring, for 24 hours. Approximately 8000 parts of water is then added, whereupon the benzene layer is, successively, separated, washed with water, and subjected to vacuum distillation to remove the solvent. The residual dark viscous oil is the desired 1-(β-di-n-butylaminopropyl)-3-carboline.

B. *1 - (β - di - n - butylaminopropyl) - 3 - carboline dihydrochloride.*—Conversion of the base of the preceding part A of this example to the hydrochloric acid salt is accomplished according to the technique of Example 1B by dissolving 247 parts of the said base in 2100 parts of anhydrous ether and reacting this solution with two molecular equivalents of absolute alcoholic hydrogen chloride solution. The 1-(β-di-n-butylaminopropyl)-3-carboline dihydrochloride thus obtained is moderately soluble in water.

C. *1 - (β - di - n - butylaminopropyl) - 3 - carboline ethiodide.*—Following the procedures of Examples 1C and 2E, 1-(β-di-n-butylaminopropyl)-3-carboline is quaternized by reacting 337 parts thereof together with 156 parts of ethyl iodide in 1450 parts of dry chloroform, maintaining the reagents in a closed system to prevent evaporation losses. After 24 hours, the solvent is stripped in vacuo; and 4500 parts of anhydrous ether is then added. The desired product is obtained as a viscous oil which granulates on standing. It has the formula

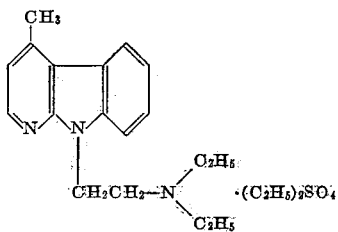

Example 4

A. *1 - (6' - methyl - 2' - pyridyl) - benzotriazole.*—A mixture of 179 parts of 6-methyl-2-bromopyridine and 112 parts of o-phenylenediamine is heated in the presence of 4 parts of copper powder according to the technique detailed in Example 2A. The reaction product—following addition of 525 parts of hot alcohol, acidification with 2500 parts of 10% aqueous hydrochloric acid, and filtering out of the copper—is diazotized with 125 parts of sodium nitrite to give, in good yield, the desired 1-(6'-methyl-2'-pyridyl)-benzotriazole, M. P. 84-85° C.

B. *4-methyl-3-carboline.*—Following the procedure of Example 2B, 165 parts of 1-(6'-methyl-2'-pyridyl)-benzotriazole and 1410 parts of 85% phosphoric acid are reacted together; and the product is treated with a hot alcoholic solution of picric acid to give the crude carboline picrate. The picrate is treated with 8% aqueous caustic soda to yield the crude methylcarboline which is, in turn, first extracted for 15 minutes with 2400 parts of boiling alcohol, and then, following precipitation (on cooling) and recovery from this extract of an initial crop of crystals melting at 254-255° C., is re-extracted for 10 minutes with the boiling crystallization mother liquors to give, on vacuum concentration to one-sixth the original volume, an additional crop of crystals, M. P. 255° C. The desired 4-methyl-3-carboline is obtained in the form of pearl gray plates.

C. *1-(β - diethylaminoethyl)-4-methyl-3-carboline.*—In accordance with the procedure detailed in Example 2C, interaction of 145 parts of 4-methyl-3-carboline, 31 parts of sodamide, and 108 parts of β-diethylaminoethyl chloride, in 435 parts of xylene, gives a good yield of 1-(β-diethylaminoethyl)-4-methyl-3-carboline as a dark oil.

D. *1-(β - diethylaminoethyl)-4-methyl-3-carboline dihydrochloride.*—The oily base of Example 4C is converted to the hydrochloric acid addition salt in conventional fashion by treatment with two equivalents of absolute alcoholic hydrogen chloride solution. Crystallization of the crude dihydrochloride from 11 volumes of absolute alcohol, using decolorizing charcoal in process, gives colorless crystals of 1-(β-diethylaminoethyl)-4 - methyl - 3 - carboline dihydrochloride, M. P. 237–238° C. The product is moderately soluble in water.

E. *1-(β - diethylaminoethyl)-4-methyl-3-carboline methobromide.*—Using the procedure of Example 1C, the quaternary ammonium salt of the foregoing 1-(β-diethylaminoethyl)-4-methyl-3-carboline is obtained, following crystallization from a mixture of isopropyl alcohol and ethyl acetate, as pale yellow crystals, M. P. 142–143° C. The product is quite soluble in water. It has the formula

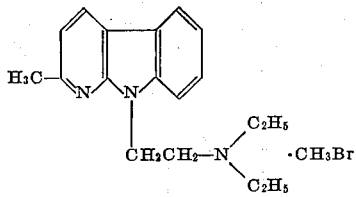

Example 5

A. *1-(β - diethylaminoethyl)-5-carboline.*—By the method of Example 1A, 67 parts of 5-carboline-prepared according to the method of Robinson and Thornley described in the "Journal of the Chemical Society," 1924, 2170–2172—16 parts of sodamide, and 54 parts of β-diethylaminoethyl chloride, in 350 parts of dry xylene, are reacted together to give 1-(β-diethylaminoethyl)-5-carboline as a viscous oil.

B. *1-(β-diethylaminoethyl)-5-carboline dihydrochloride.*—The 5-carboline base of the preceding part A is converted in conventional fashion to the hydrochloric acid addition salt using two equivalents of absolute alcoholic hydrogen chloride solution in anhydrous ether medium. Following crystallization from approximately 30 volumes of absolute alcohol, colorless crystals of 1-(β - diethylaminoethyl)-5 - carboline dihydrochloride are obtained which show M. P. 297° C. The material is quite soluble in water. It has the formula

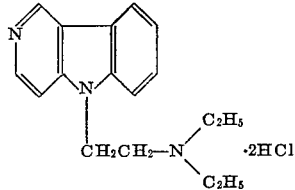

Example 6

A. *4,5-benzo-1-(β - diethylaminoethyl)-3-carboline.*—A mixture of 42 parts of 4,5-benzo-3-carboline—obtained by the method of Robinson and Thornley as reported in the "Journal of the Chemical Society," 1924, 634—and 4350 parts of boiling xylene is reacted with 8 parts of sodamide under a nitrogen atmosphere, according to the technique of Example 1A. After 5½ hours, evolution of ammonia ceases, whereupon 27 parts of β-diethylaminoethyl chloride is introduced; and the reactants are then maintained for 15 hours at reflux temperature. The product is worked up as before to give a good yield of 4,5-benzo-1-(β-diethylaminoethyl)-3-carboline as a dark oil.

B. *4,5-benzo-1-(β - diethylaminoethyl)-3-carboline dihydrochloride.*—The base obtained in part A of this example is dissolved in 1100 parts of anhydrous ether, the solution is treated with decolorizing charcoal, and two equivalents of absolute alcoholic hydrogen chloride solution is then added. The yellow dihydrochloride thus precipitated is, successively, recovered on a funnel, dried over sodium hydroxide in vacuo, and crystallized from 18 volumes of absolute alcohol to give tiny, pale yellow needles, M. P. 242–244° C. The product, 4,5-benzo-1-(β - diethylaminoethyl)-3-carboline dihydrochloride, is only moderately soluble in warm water. It has the formula

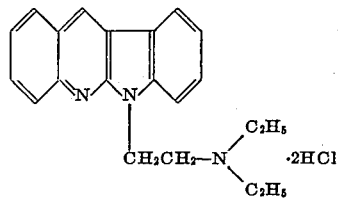

I claim:

1. A member of the group consisting of compounds of the formula

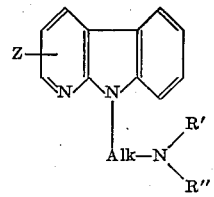

wherein Z is selected from the group consisting of hydrogen and a methyl radical, Alk is a lower alkylene radical containing at least 2 and not more than 4 carbon atoms, and NR'R" is selected from the group consisting of lower dialkylamino, piperidino, pyrrolidino, and morpholino radicals; non-toxic acid addition salts thereof; and quaternary ammonium salts of the formula

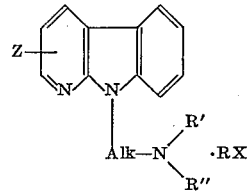

wherein Z, Alk, and NR'R" have the meanings hereinabove assigned, R is a lower alkyl radical, and X is one equivalent of a non-toxic anion.

2. A dialkylaminoethyl-3-carboline quaternary ammonium salt of the formula

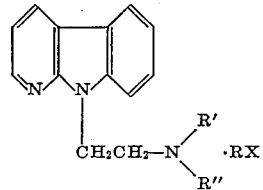

wherein R, R' and R" are lower alkyl groups, and X is halogen.

3. 1 - (β-diethylaminoethyl) - 3 - carboline methobromide.

4. A dialkylaminoethyl - methyl - 3 - carboline acid addition salt of the formula

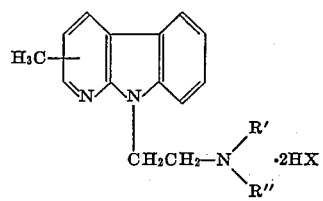

wherein R' and R'' are lower alkyl groups, and X is halogen.

5. A diethylaminoethyl - methyl - 3 - carboline dihydrochloride of the formula

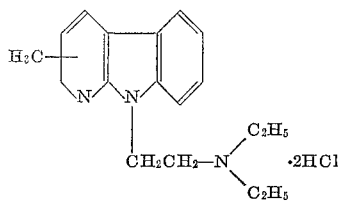

6. 1 - (β-diethylaminoethyl) - 4 - methyl - 3-carboline dihydrochloride.

7. 1 - (β-diethylaminoethyl) - 6 - methyl - 3-carboline dihydrochloride.

8. 1 - (β-diethylaminoethyl) - 3 - carboline dihydrochloride.

9. 1 - (β-di-n-butylaminopropyl) - 3 - carboline dihydrochloride.

No references cited.